Sept. 12, 1939.  K. BAUER ET AL  2,172,784
PROCESS FOR OBTAINING VALUABLE ORGANIC COMPOUNDS FROM THE
ACID SLUDGE OF MINERAL OIL REFINING PROCESSES
Filed March 4, 1937  2 Sheets-Sheet 1
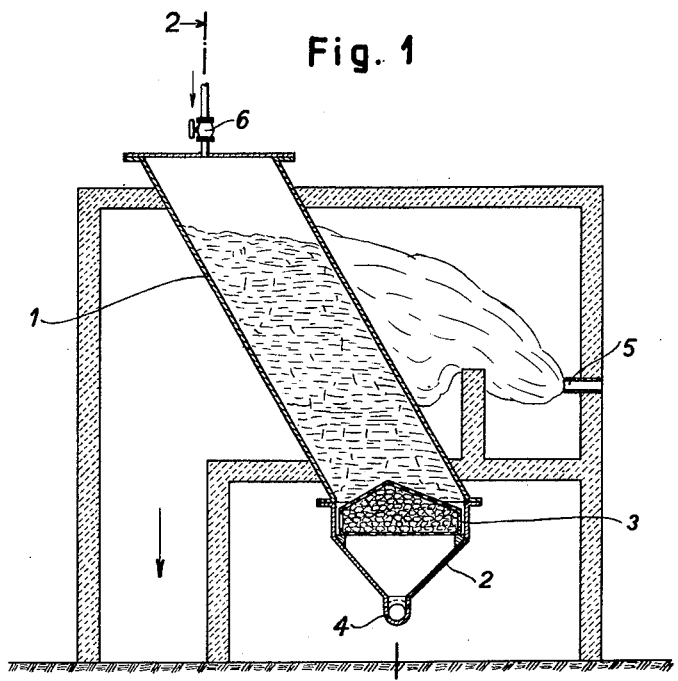
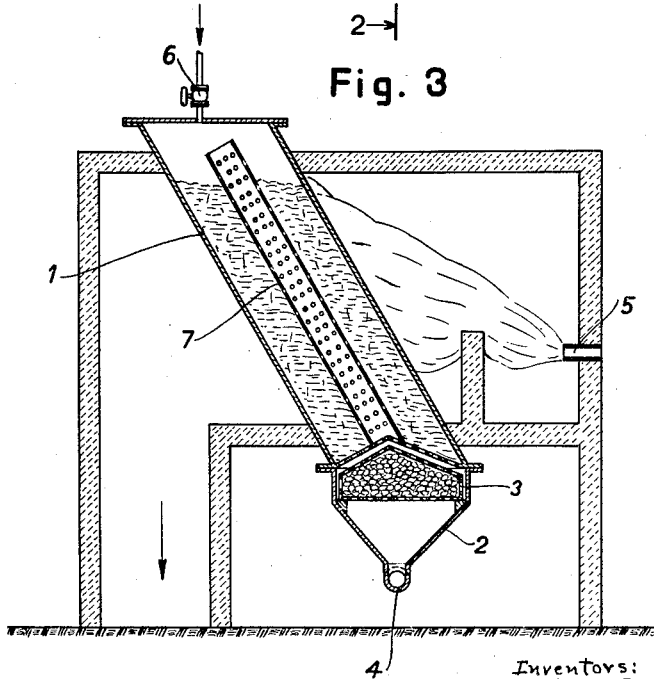
Inventors:
Karl Bauer
Wacław Junosza v. Piotrowski
Hugo Burstin
Józef Winkler
By Munson Hare
Attorney.

Patented Sept. 12, 1939

2,172,784

UNITED STATES PATENT OFFICE 2,172,784

PROCESS FOR OBTAINING VALUABLE ORGANIC COMPOUNDS FROM THE ACID SLUDGE OF MINERAL OIL REFINING PROCESSES

Karl Bauer, Waclaw Junosza v. Piotrowski, Hugo Burstin, and Józef Winkler, Drohobycz, Poland Application March 4, 1937, Serial No. 129,096
In Poland March 23, 1936

11 Claims. (Cl. 196—148)

The present invention relates to a method of obtaining fusible organic compounds from acid wastes of mineral oil refining processes.

Acid wastes (named also acid sludge) obtained as a by-product in the refining of mineral oil with sulfuric acid contain mainly the following constituents:

1, Sulfonic acids; 2, free sulfuric acid; 3, neutral organic compounds i. e. occluded mineral oil and asphalt-like products formed by partial oxidation, polymerisation and condensation of mineral oil hydrocarbons; 4, solid carbonaceous substances insoluble in the known solvents.

Many processes have been proposed for the manufacturing of valuable products by refining acid sludges. These processes may be divided into two groups.

The first group comprises methods for obtaining valuable compounds from acid sludge without previous neutralisation of the free sulfuric acid contained therein. To this group belong the processes for regeneration of sulfuric acid with simultaneous production of the bitumen contained in the acid sludge. According to one method the sludge is, for instance, boiled with water, dilute sulfuric acid and free bitumen being thus obtained. Another known way for utilizing refining wastes is the treatment of acid sludge with organic solvents, the organic components such as bitumen, sulfonic acids and others being thereby dissolved and free sulfuric acid separated.

The above mentioned processes are not commercially practical since they require expensive operations while the resulting products, sulfuric acid and bitumen, are of inferior quality and cannot be sold at a reasonable price.

The second group comprises methods of treating acid sludge, in most cases previously neutralized with alkalies or earth alkalies. The neutralized sludge may be treated—for instance—with extracting means, in which case the bitumen will pass into the extract. Moreover neutralized sludges may also be used for production of sulfonic acids.

These processes are also not very profitable because—for instance—by extraction of the neutralized sludge only part of the organic compounds contained therein are recovered. Furthermore the products obtained by processes of the second group are not of good quality.

Further proposals have been made for obtaining valuable products by distilling the neutralized sludge in vacuo or in the presence of steam. It has proved, however, very difficult or almost impossible to distill a solid dry mass without decomposition. A dry distillation of such a mass—which is only slightly conductive to heat—always involves at least a partial decomposition of the higher boiling hydrocarbons.

It is the primary object of the present invention to obtain in an inexpensive and simple manner the organic compounds contained in the acid sludges without decomposition.

We have discovered, and the present process is based on this discovery, that upon moderate heating of the neutralized sludge, there may be caused to separate out on the surface of the dry solid or plastic mass a dark liquid which freely flows off, free from inorganic bulk, through the hollow spaces of the mass. The liquid contains the total amount of desired organic compounds in undecomposed state.

The neutralized sludge must be heated in such a manner that its temperature will not rise above the average boiling temperature of the organic compounds contained in the sludge. In most cases a temperature of 200—300° C. will be sufficient to obtain the desired compounds in the liquid state. The heat necessary for melting out the organic compounds may be imparted to the mass either directly by means of hot vapors or non-oxidizing gases or mixtures thereof, or the mass may be heated from the outside by indirect supply of heat. In some cases it is advantageous to combine direct and indirect heating. Different forms of apparatus may be used for melting out the organic compounds from the neutralized sludge.

If the neutralized sludge is not of powdery but rather of plastic consistency it is advantageous to mix it with a loosening material for instance gravel, slag, coal, coke, limestone or the like. By these means hollow spaces are provided through which the liquified organic compounds freely flow off. It is also advantageous to admix a well divided material of good heat conductivity such as iron powder, copper shavings and the like.

It is convenient to provide at the lowest point of the apparatus serving for melting out the fusible organic compounds a layer of granular material consisting—for instance—of one of the above mentioned loosening materials for the purpose of retaining the finest inorganic compounds carried along.

In some cases, especially if a sludge containing few organic compounds is treated, it is advantageous to impregnate the dry mass consisting of neutralized sludge with a light mineral oil, for instance, kerosene or gasoil. Thereby the organic compounds will melt out at a lower temperature than if the mass were used in the unwetted state.

The process according to the present invention is described in the following examples and illustrated by the annexed drawings which show two different embodiments of an apparatus for carrying out the process. It should be understood that the invention is, however, not limited by the examples given and by the devices shown in the drawings.

Fig. 1 is a vertical longitudinal section through the apparatus.

Fig. 3 is a vertical longitudinal section through a modified form of the apparatus.

Figure 2:
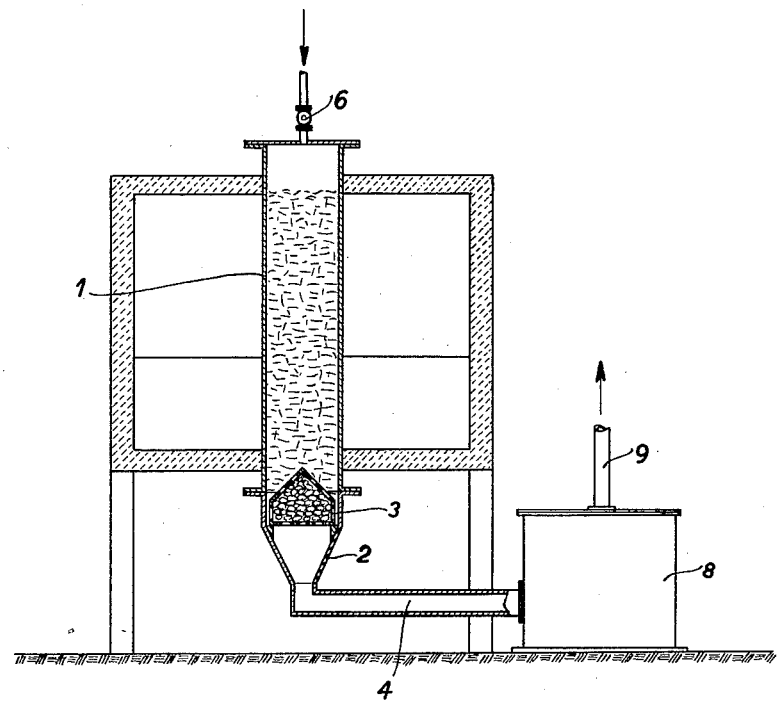
Fig. 2 is a section along line 2—2 of Fig. 1.

In Figs. 1 and 2 there is shown an oblique retort 1 mounted within a furnace, the retort being closed at the bottom by an iron basket 3 filled with slag or other lumpy material. The basket 3 is placed in a funnel 2 leading the molten organic liquid through the channel 4 into the receiver 8, which by means of the pipe 9 may be connected with an exhauster, not shown in the drawings. At the top the retort is closed by a cover with the valve 6 serving for introduction of steam or hot gases, if required. The burner 5 serves as a heating device.

In Fig. 3 the retort differs from the one shown in Figs. 1 and 2 in having a tube 7 arranged therein. This tube is provided with small perforations and serves for better draining off the molten organic liquid.

*Example 1:* The retort 1 is filled to ⅘ of its capacity with a mass consisting of acid sludge neutralized with lime and mixed with 30 per cent. of slag. The cover is put onto the retort which is then heated by the gas-burner 5 to about 275° C. After about 1 hour a dark liquid consisting of the molten organic compounds begins to flow down the funnel 2. If the apparatus according to Figs. 1 and 2 is used the liquid is collected in the receiver 8. The total amount of liquified organic compounds is 45 per cent. by weight, calculated on the weight of the acid sludge.

*Example 2:* Neutralized sludge is mixed with 20 per cent. of gravel and 5 per cent. of iron turnings. To this mass 10 per cent. by weight of kerosene are added while stirring thoroughly. Thereby the mass is wetted, but should not be allowed to separate a liquid product. Then the mass is poured into the retort 1 described above. After the retort is closed it is heated by the gas-burner with simultaneous admission of hot combustion gases and a little superheated steam by the valve 6. At about 180° C. the organic compounds begin to melt out. The highest temperature of the mass does not surpass 250° C. From the dark liquid thus obtained kerosene is distilled off by the use of superheated steam. The output of molten organic compounds, calculated on treated acid sludge, amounts to 42 per cent. by weight.

If desired, the container 8 may be connected by means of pipe 9, with an exhauster sucking off the hot combustion gases and the uncondensed steam, if any, the melting out of the fusible compounds being thereby facilitated. In this case the relative pressure in the retort is reduced about 50 to 100 millimeters mercury.

In the modified apparatus shown in Fig. 3 which may be used for carrying out either of the above examples, the arrangement of tube 7 serves the purpose of providing a free space in the retort which serves as a draining device and facilitates the discharge of the molten organic compounds. Instead of the tube carrying holes some other means can be provided for the same purpose, for instance a mechanical resisting wire gauze separating an empty segment of the retort or the like.

What we claim is:

1. A process for obtaining valuable organic compounds from a chemically neutralized acid sludge derived from mineral oil refining processes and containing fusible organic compounds, which process comprises melting the fusible organic compounds by heating the sludge at a temperature substantially within the range of 200–300° C., separating the organic compounds while in the molten condition from the inorganic residue and withdrawing said molten product substantially free from inorganic residue.

2. A process as set forth in claim 1, wherein the melting of the sludge is accomplished by treatment with hot gases.

3. A process according to claim 1, wherein the sludge is melted by indirect heating.

4. A process according to claim 1, wherein the sludge is melted by combined direct and indirect heating.

5. A process for obtaining valuable organic compounds from acid sludge derived from mineral oil refining processes and containing fusible organic compounds, which process comprises heating chemically neutralized acid sludge at a temperature substantially within the range of 200°–300° C. in an inclined closed vessel, thereby melting out the fusible organic compounds, separating said organic compounds from the inorganic residue, and draining off the molten organic materials from the lower portion of the vessel substantially free from inorganic residue.

6. A process according to claim 5, wherein solid inert filtering material is employed at the lower end of the closed vessel.

7. A process for obtaining valuable organic compounds from the acid sludge of mineral oil refining processes which comprises wetting a chemically neutralized acid sludge containing fusible organic compounds, with a mineral oil of low boiling point, heating the so obtained mass to a temperature below the average boiling temperature of the fusible organic compounds and substantially within the range of 200°–300° C., thereby melting said fusible organic compounds, separating the molten organic compounds from the inorganic residue and draining off said molten organic compounds.

8. A process for obtaining valuable organic compounds from the acid sludge of mineral oil refining processes which comprises adding to a neutralized acid sludge containing fusible organic compounds a solid, inert, loosening material, heating the so obtained mass below the average boiling temperature of the fusible organic compounds and substantially within the range of 200°–300° C., thereby melting said fusible organic compounds, and draining off the molten organic compounds substantially free from inorganic residue.

9. A process according to claim 8 in which a loosening material selected from a group consisting of gravel, coal, coke, limestone and slag is used.

10. A process for obtaining valuable organic compounds from the acid sludge of mineral oil refining processes which comprises adding to a neutralized acid sludge containing fusible organic compounds a solid heat conductive material, heating the so obtained mass to a temperature below the average boiling temperature of the fusible organic compounds and substantially within the range of 200°–300° C., thereby melting said fusible organic compounds, separating the molten portion from the inorganic residue and draining off said molten organic compounds.

11. A process according to claim 10 in which a heat conductive means selected from a group consisting of iron turnings, iron Raschig rings and copper filings are added.

KARL BAUER.
WACLAW JUNOSZA v. PIOTROWSKI.
HUGO BURSTIN.
JÓZEF WINKLER.